United States Patent [19]

Vali et al.

[11] Patent Number: 5,155,792
[45] Date of Patent: Oct. 13, 1992

[54] LOW INDEX OF REFRACTION OPTICAL FIBER WITH TUBULAR CORE AND/OR CLADDING

[75] Inventors: Victor Vali, Laguna Hills; David B. Chang, Tustin, both of Calif.

[73] Assignee: Hughes Aircraft Company, Los Angeles, Calif.

[21] Appl. No.: 724,565

[22] Filed: Jun. 27, 1991

[51] Int. Cl.⁵ .............................. G02B 6/20
[52] U.S. Cl. .................... 385/125; 385/123; 385/126; 385/127; 385/147
[58] Field of Search ............ 350/96.10, 96.24, 96.25, 350/96.28, 96.30, 96.32, 96.33, 96.23; 385/102, 109, 112, 123, 127, 125, 127, 100, 142, 144, 147

[56] References Cited

U.S. PATENT DOCUMENTS

| | | | |
|---|---|---|---|
| 3,516,239 | 6/1970 | Fukuda et al. | 350/96.32 X |
| 3,814,499 | 6/1974 | Marcatilli | 350/96.32 X |
| 3,844,752 | 10/1974 | Kaiser | 350/96.32 X |
| 3,976,357 | 8/1976 | Lohmeyer | 350/96.32 X |
| 4,921,327 | 5/1990 | Zito | 385/125 |
| 5,005,944 | 4/1991 | Laakmann et al. | 385/125 |

Primary Examiner—Brian Healy
Attorney, Agent, or Firm—Michael W. Sales; Wanda K. Denson-Low

[57] ABSTRACT

An optical fiber having an index of refraction less than that conventionally available. The low index of refraction fiber 10 of the present invention includes a fiber core 20 of a first index of refraction. The fiber core 20 circumscribes a longitudinal axis, and is surrounded by a cladding layer 30 having a second index of refraction less than the first index of refraction. Included within the cladding layer 30 are a plurality of tube structures 40 arranged about the fiber core 20. The tube structures 40 create a plurality of channels 42 within the cladding layer 20, thereby engendering a low index of refraction therein.

31 Claims, 1 Drawing Sheet

LOW INDEX OF REFRACTION OPTICAL FIBER WITH TUBULAR CORE AND/OR CLADDING

BACKGROUND OF THE INVENTION

1. Field of the Invention

This invention relates to optical fibers. More specifically, this invention relates to optical fibers having relatively low indices of refraction.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

In conventional fiber optic sensors light guided within an optical fiber is modified in reaction to various external physical, chemical or similar influences. In operation, light from a source having relatively stable optical properties is typically coupled into the fiber of the conventional sensor. The light is then directed by the fiber to a region in which a measurement is to take place. In extrinsic sensors the guided light then may exit the fiber and interact with the substance being measured (measurand) prior to again being launched into the same or a different fiber. Alternatively, in intrinsic sensors the light remains within the fiber throughout the measurement region.

In extrinsic sensors reflection losses are incurred as the guided light leaves the optical fiber and enters the measurand. In particular, these reflection losses are proportional to the difference between the indices of refraction of the fiber and the measurand. At present, the minimum index of refraction (at visible wavelengths) of optical fibers is believed to be approximately 1.4. Consequently, reflection losses are generally unavoidable when extrinsic sensors are employed to analyze material having an index of refraction (n) less than 1.4. For example, in the visible spectrum water exhibits an index of refraction of approximately 1.33.

In another type of optical fiber sensor, generally known as an evanescent field sensor, the light guided by the fiber partially couples to the measurand via an evanescent (i.e. exponentially decaying) field which surrounds the fiber. That is, a portion of the optical energy carried by the fiber (the evanescent wave) propagates along the length of the fiber within a region of space immediately surrounding the cladding. The measurand surrounding the fiber may either absorb or change the properties of the evanescent field, thus enabling a measurement to be performed. Employment of evanescent mode over extrinsic mode fiber sensors may be preferred in applications requiring direct interaction between the light beam and the measurand since the former approach requires no relaunching of the beam.

Unfortunately, the cladding layer of optical fibers included within conventional evanescent mode sensors is typically required to have an index of refraction less that of the measurand. In addition to water, measurands such as gasoline (n 1.4) having low indices of refraction are thus generally incompatible with evanescent wave sensors employing conventional optical fibers.

Accordingly, a need in the art exists for an optical fiber having an index of refraction less than that known to be conventionally available.

SUMMARY OF THE INVENTION

The need in the art for an optical fiber having an index of refraction less than that conventionally available is addressed by the low index of refraction fiber of the present invention. The inventive fiber includes a fiber core of a first index of refraction. The fiber core circumscribes a longitudinal axis, and is surrounded by a cladding layer having a second index of refraction less than the first index of refraction. Included within the cladding layer are a plurality of tube structures arranged about the fiber core. The tube structures create a plurality of channels within the cladding layer, thereby engendering a low effective index of refraction therein.

BRIEF DESCRIPTION OF THE DRAWINGS

FIG. is a cross-sectional view of a preferred embodiment of the low index of refraction fiber of the present invention.

DETAILED DESCRIPTION OF THE INVENTION

Figure 1:
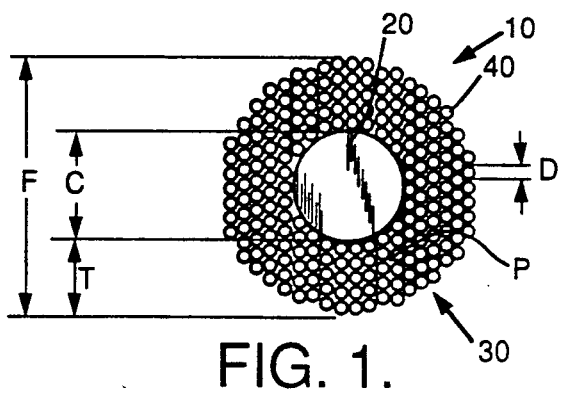

FIG. 1 is a cross-sectional view of a preferred embodiment of the low index of refraction fiber 10 of the present invention. The inventive fiber 10 includes a cylindrical fiber core 20 circumscribed by a cladding layer 30. The core 20 circumscribes a longitudinal axis (not shown) normal to the plane of FIG. 1. As is shown in FIG. 1, the cladding layer 30 includes a plurality of hollow cylindrical tube structures 40 arranged parallel to the longitudinal axis of the core 20. Each tube structure 40 defines a channel 42 of cross-sectional diameter D, with each channel 42 typically being filled with air. In addition, the tube structures are arranged within the layer 30 so as to form a plurality of interstitial passageways P therebetween. Both the diameter D and the cross-sectional dimensions of the passageways P (i.e. dimensions perpendicular to the longitudinal axis of the core 20) are selected to be less than the shortest wavelength of light guided by the inventive fiber 10. In this manner, light propagating within the fiber 10 is substantially prevented from scattering away from the core 20.

As is explained hereinafter, the fiber 10 of the present invention may be designed such that both the cladding layer and the core thereof have indices of refraction (n) less than those generally provided by conventional fibers. For example, in the preferred embodiment of FIG. 1 a low index of refraction for the cladding 30 is effected by incorporating the channels 42 therein. In particular, if the channel diameter D is chosen to be less than the shortest light wavelength of interest then the effective index of refraction of the cladding 30 will correspond to a weighted average of the indices of refraction of air and of the medium of the tube structures 40. The weighting factors assigned to the indices of refraction of air (n=1) and the medium of the structures 40 correspond to the relative contribution of each to the cross-sectional area of the cladding 30 (FIG. 1). Although both the channels 42 and the interstitial passageways P contribute to the weighting factor associated with the index of refraction of air, the contribution of the passageways P thereto is relatively small in the embodiment of FIG. 1. Accordingly, by appropriately selecting the channel diameter D, the index of refraction of the cladding 30 may be reduced below the index of refraction of the medium from which the tube structures 40 are fabricated.

As shown in FIG. 1, the fiber 10 has a cross-sectional diameter F. In addition, the core 20 is of diameter C while the cladding layer 30 has a thickness T. The thickness T chosen for the cladding layer 30 relative to the core diameter D will depend on the contemplated mode of operation of the fiber 10. Techniques for adapting a particular fiber design to single or multi-mode operation are known in the art. For example, in single mode optical fibers (supporting only a dominant propagation mode) the ratio of cladding thickness T to core diameter D is typically on the order of twenty to one. It follows that for a standard fiber diameter F of one hundred twenty microns the core diameter D will typically not exceed six microns. The exact values chosen for the thickness T and the diameter D will depend on the particular mode being supported by the fiber 10. In multi-mode fibers, the ratio between the thickness T and diameter D will generally be much closer to one to one. Multi-mode operation is also sometimes facilitated by increasing the difference in the respective indices of refraction of the core 20 and the cladding layer 30.

The fiber core 20 may be realized from, for example, a mixture of silicon dioxide and germanium oxide ($GeO_2$) to yield an index of refraction of approximately 1.45. The tube structures 40 within the cladding layer 30 may be realized from a variety of materials including fused quartz, plastic, or silicon dioxide ($SiO_2$). Silicon dioxide has an index of refraction of 1.45.

The core 20 and cladding 30 may be contemporaneously fabricated using a conventional fiber optic drawing process in order to form the fiber 10. Specifically, an arrangement including a solid rod surrounded by a plurality of preform capillary tubes is suspended from a draw tower used to fabricate optical fibers. This suspended arrangement is then heated and drawn using techniques familiar to those skilled in the art. The drawn solid rod forms the fiber core 20, while the preform capillary tubes are drawn into the tube structures 40 of the cladding layer 30. As a consequence of the heating accompanying the drawing process the capillary preforms will become affixed to each other and to the fiber core 20. Subsequent to completion of the drawing process a thin plastic coating (not shown) may be applied to the exterior surface of the cladding 30 for protection.

During the drawing process the original dimensions of the capillary tubes will undergo proportionate reductions. It follows that the percentage of the cross-sectional area of the cladding 30 consisting of air (i.e. the cumulative cross-sectional areas of the channels C and interstitial passageways P) may be controlled by selecting capillary preforms of particular dimensions. Since the ratio of the area encompassed by air to the area of the solid portion of the tube structures 40 in the cross-sectional view of FIG. 1 is proportional to the effective index of refraction of the cladding layer 30, the present invention provides a technique for reducing the index of refraction of the cladding 30. The actual index of refraction for a specific arrangement of tube structures 40 within the cladding 30 may be estimated using two dimensional formulations of dispersion expressions (e.g. Maxwell-Wagner, Clausius-Mossatti, Bruggermann) for structures including more than a single propagation medium. As in conventional optical fibers, the index of refraction of the cladding 30 is designed to be less than the index of refraction of the fiber core 20.

In operation, light may be conventionally launched on the fiber 10 by way of a lens arrangement. For example, one end of the fiber 10 may be placed at the focal point of a lens disposed to focus a spot beam upon the core 20 of the fiber 10. Again, the capillary preforms are selected such that at the conclusion of the drawing process the channel diameter C of each is less than the minimum light wavelength within the spot beam focused upon the core 20. In general, the cross-sectional dimensions of the capillary preforms will be reduced by a factor on the order of several hundred as a result of being drawn into the tube structures 40.

Figure 2:
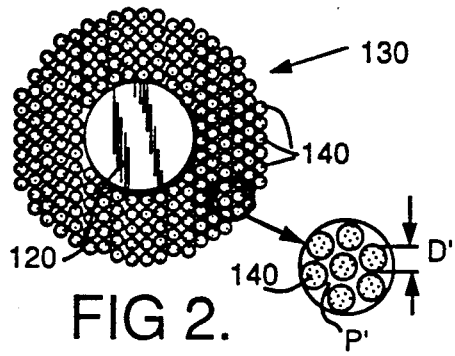
FIG. 2 a cross-sectional view of an alternative embodiment of the low index of refraction fiber of the resent invention.

FIG. 2 shows a cross-sectional view of an alternative embodiment of the low index of refraction fiber 100 of the present invention. The inventive fiber 10 includes a cylindrical fiber core 120 circumscribed by a cladding layer 130. The core 120 circumscribes a longitudinal axis (not shown) normal to the plane of FIG. 2. As is shown in FIG. 2, the cladding layer 130 includes a plurality of cylindrical rod structures 140 arranged parallel to the longitudinal axis of the core 120. The rod structures 140 are arranged within the layer 130 so as to form a plurality of interstitial passageways P' therebetween. In addition, the diameter D' of the rod structures 140 is chosen such that cross-sectional dimensions of the passageways P' are less than the shortest wavelength of light guided by the inventive fiber 100. This substantially prevents light propagating within the fiber 100 from scattering away from the core 120.

As discussed above, if the dimensions of the passageways P' are chosen to be less than the shortest light wavelength of interest then the effective index of refraction of the cladding 130 will correspond to a weighted average of the indices of refraction of air and of the medium of the rod structures 140. Again, the weighting factors assigned to the indices of refraction of air (n=1) and the medium of the structures 140 correspond to the relative contribution of each to the cross-sectional area of the cladding 130. By selecting the manner in which the rod structures 140 are packed around the fiber core 120 the index of refraction of the cladding 130 may be reduced below the index of refraction of the medium from which the rod structures 140 are fabricated.

Figure 3A:
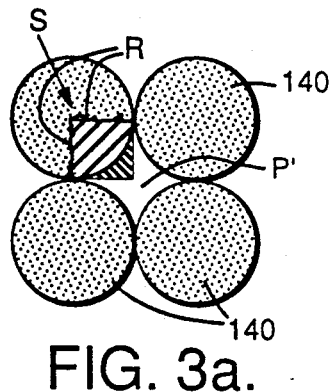
FIG. 3a illustrates a plurality of rod structures arranged in a square packing configuration within the cladding layer of the inventive fiber.
Figure 3B:
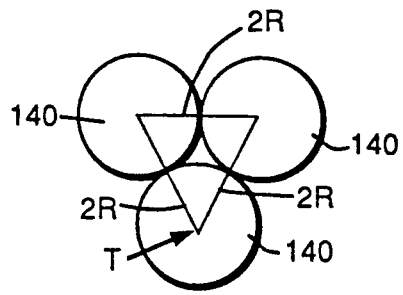
FIG. 3b illustrates a plurality of rod structures arranged in a hexagonal packing configuration within the cladding layer of the fiber of the present invention.

FIGS. 3a and 3b illustrate the rod structures 140 arranged in square and hexagonal packing configurations, respectively, within the cladding layer 130. The effective indices of refraction of the layer 130 may in both instances be estimated by determining the relative cross-sectional proportions of air and of the solid medium utilized in fabricating the rods 140. For example, the relevant cross-sectional proportions for the square-packed case of FIG. 3a may be estimated by calculation of the proportions of solid and air within a square S superimposed thereon. As shown in FIG. 3a, the square S includes sides of length R—where R is equivalent to the radius of the square rods 140. Since the area of the solid portion within the square S is equivalent to $\pi R^2/4$, the area of air within the square S may be expressed as $R^2(1-\pi/4)$. It follows that the ratio of air area within the square S to the area ($R^2$) of the square S is given by $(1-\pi/4) \approx 0.215$. Thus, the proportion of solid region within the square S is given by $(1-0.215)=0.785$. Assuming the rods 140 are fabricated from a material having an index of refraction of 1.45, the effective index of refraction ($n_{eff,s}$) of the cladding 130 with square packing is approximately equivalent to:

$$n_{eff,s} \approx 1.45(0.785) + 1(0.215) = 1.35 \qquad (1)$$

A substantially similar analysis may be applied to the hexagonally-packed arrangement of FIG. 3b. As shown in FIG. 3a, a triangle T having sides of length 2R is superimposed over the hexagonal configuration of rods 140. The area of the triangle T is equivalent to $(3)^{\frac{1}{2}}R^2$, while the area of the solid portion included therein is given by $3(\pi R^2/6) = \pi R^2/2$. It follows that the ratio of air area within the triangle T to the area triangle T is given by $R^2(3^{\frac{1}{2}}-\pi/2) \div (3)^{\frac{1}{2}}R^2 = 1-\pi/2(3)^{\frac{1}{2}} \approx 0.096$. The corresponding proportion of solid within the triangle T is thus approximated by $(1-0.096) \approx 0.904$. The effective index of refraction ($n_{eff,h}$) of the cladding 130 with hexagonal packing of the rods 140 may thus be approximated by:

$$n_{eff,h} \approx 1.45(0.904) + 1(0.096) = 1.407 \qquad (2)$$

The fiber core 120 and the rod structures 140 may be constructed from the same materials used to realize the core 20 and tube structures 40. That is, the fiber core 120 may be realized from a mixture of silicon dioxide and germanium oxide (GeO$_2$) to yield an index of refraction of approximately 1.45. The rod structures 140 will typically be fabricated from one of a variety of preform rods including fused quartz, plastic, or silicon dioxide (SiO$_2$). The fiber 100 may be fabricated by using the conventional drawing process described above with reference to the fiber 10.

Figure 4:
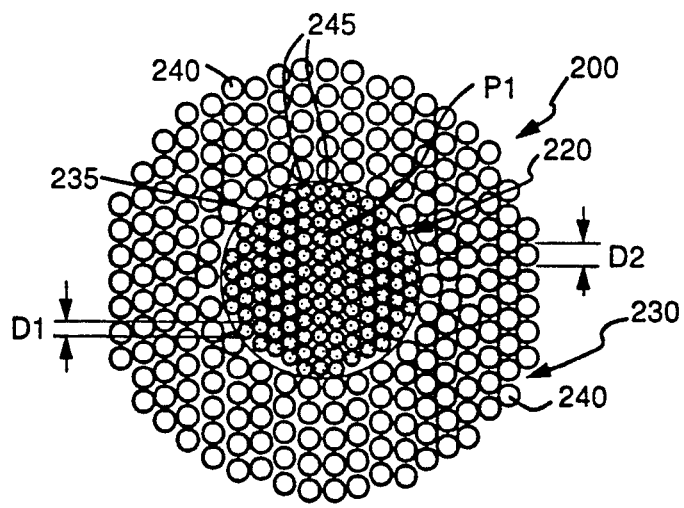
FIG. 4 shows a cross-sectional view of another alternative embodiment of the low index of refraction fiber of the present invention.

FIG. 4 shows a cross-sectional view of another alternative embodiment of the low index of refraction fiber 200 of the present invention. The inventive fiber 200 includes a fiber core region 220 circumscribed by a cladding layer 230, with the interface therebetween indicated by the dashed line in FIG. 4. The inventive fiber 200 is substantially similar to the inventive fiber 10 (FIG. 1) with the exception that the core region 220 includes a first set of cylindrical tube structures 235. As is shown in FIG. 2, the cladding layer 230 includes a second set of cylindrical tube structures 240 arranged parallel to the first set of tube structures 235 within the core 220.

Each of the tube structures 235 defines a channel 245 having a diameter D1 less than the shortest wavelength of light carried by the fiber 200. In addition, the structures 235 are arranged within the core region 220 so as to form a plurality of interstitial passageways P1 therebetween. The dimensions of each passageway P1 perpendicular to the optical path through the fiber 200 are also less than the shortest wavelength of light guided thereby. Again, selection of these dimensions for the diameter D1 and the passageways P1 substantially prevents undesirable diffusion of light into the cladding layer 230. The tube structures 235 will typically be fabricated from capillary preforms fashioned from, for example, a mixture of silicon dioxide and germanium oxide (GeO$_2$) yielding an index of refraction of approximately 1.45.

The cladding layer 230 may be realized in a manner substantially identical to that used to fabricate the cladding layer 30. That is, the second set of tube structures 240 will generally be fabricated from capillary preforms made of fused quartz, plastic, or silicon dioxide (SiO$_2$) The tube structures 240 each define a channel 245 of diameter D2. Again, the capillary tubes from which the core 220 and cladding layer 230 are fabricated are integrated into the inventive fiber 200 through a conventional fiber optic drawing process. As in conventional optical fibers, the effective index of refraction of the core 220 is designed to exceed the effective index of refraction of the cladding layer 230. This characteristic is effected by ensuring that the cross-sectional area ratio of air to the medium (e.g. glass) of the tube structures is less in the core 220 than in the cladding 230. As shown in FIG. 4, the diameter D1 of the tube structures 235 within the core 220 is less than the diameter D2 of the tube structures 240 within the cladding 230. In this way the ratio of air to glass within the core 220 is made less than the ratio of air to glass in the cladding layer 230. Accordingly, if the tube structures 235 and 240 are fabricated from materials having approximately the same indices of refraction then the index of refraction of the core 220 will exceed that of the cladding region 230.

Various permutations of the embodiments of the inventive low index of refraction fiber depicted in FIGS. 1, 2 and 4 may also be constructed. For example, the embodiment of FIG. 4 may be modified by substituting solid rods for the first and second sets of tube structures 235 and 240. Again, the rods would be dimensioned and packed (FIGS. 3a and 3b) in accordance with the teachings herein such that the effective index of refraction of the core exceeded that of the cladding layer. Alternatively, solid rods could be substituted solely for the first set of tube structures 235 in the embodiment of FIG. 4. In this embodiment the second set of tube structures 240 would be left intact, thus creating a hybrid fiber having both tubes and rods. Finally, solid rods and tube structures could be interspersed throughout the core and cladding. In each alternative embodiment the rod and tube structures are arranged such that the effective index of refraction of the core exceeds that of the cladding.

Thus the present invention has been described with reference to a particular embodiment in connection with a particular application. Those having ordinary skill in the art and access to the teachings of the present invention will recognize additional modifications and applications within the scope thereof. For example, the core and cladding regions of the inventive fiber are not limited to being substantially cylindrical. Those skilled in the art may be aware of applications wherein optical fibers of irregularly shaped cross section are of significant utility. Similarly, each of the tube and rod structures within the cladding (or core) do not need have the same cross-sectional dimensions. The present invention is further not limited to the utilization of any specific materials within the core and cladding regions.

It is therefore contemplated by the appended claims to cover any and all such modifications.

Accordingly, what is claimed is:

1. A low index of refraction optical fiber comprising:

a fiber core of a first index of refraction circumscribing a longitudinal axis and a fiber cladding layer having a second index of refraction less than said first index of refraction, said layer including a plurality of tube structures arranged about said fiber core wherein each of said tube structures defines a channel having cross-sectional dimensions perpendicular said longitudinal axis of less than a shortest wavelength of light guided by said fiber.

2. The fiber of claim 1 wherein each of said tube structures are arranged substantially parallel to said longitudinal axis so as to form a plurality of interstitial passageways therebetween, each of said interstitial passageways having cross-sectional dimensions perpendicular said longitudinal axis of less than the shortest wavelength of light guided by said fiber.

3. The fiber of claim 1 wherein said fiber core is fabricated from a first material of said first index of refraction and said tube structures are fabricated from a second material having an index of refraction less than said first index of refraction.

4. A low index of refraction optical fiber comprising:
a fiber core of a first index of refraction circumscribing a longitudinal axis and a fiber cladding layer having a second index of refraction less than said first index of refraction, said layer including a plurality of rod structures arranged about said fiber core.

5. The fiber of claim 4 wherein said rod structures are arranged substantially parallel to said longitudinal axis so as to define a plurality of interstitial passageways therebetween.

6. The fiber of claim 5 wherein said rod structures are arranged such that said interstitial passageways have cross-sectional dimensions perpendicular said first axis of less than a shortest wavelength of light guided by said fiber.

7. The fiber of claim 6 wherein each of said rod structures are substantially cylindrical.

8. The fiber of claim 7 wherein said fiber core is fabricated from a first material of said first index of refraction and said rod structures are fabricated from a second material having an index of refraction less than said first index of refraction.

9. A low index of refraction optical fiber comprising:
a fiber core of a first index of refraction circumscribing a longitudinal axis, said fiber core including a first set of tube structures and a fiber cladding layer circumscribing said core, said cladding layer having a second index of refraction less than said first index of refraction wherein each of said tube structures defines a channel having cross-sectional dimensions perpendicular said longitudinal axis of less than a shortest wavelength of light guided by said fiber.

10. The fiber of claim 9 wherein each of said channels are cylindrical and said tube structures are arranged substantially parallel to said longitudinal axis so as to form a plurality of interstitial passageways therebetween, each of said interstitial passageways having cross-sectional dimensions perpendicular said longitudinal axis of less than the shortest wavelength of light guided by said fiber.

11. The fiber of claim 10 wherein said first set of tube structures is fabricated from a first material and said cladding is fabricated from a second material having said second index of refraction.

12. The fiber of claim 9 wherein said cladding layer includes a second set of tube structures arranged about said core, each of said tube structures defining a channel having cross-sectional dimensions perpendicular said longitudinal axis of less than the shortest wavelength of light guided by said fiber.

13. The fiber of claim 12 wherein each of said channels are cylindrical and said second set of tube structures are arranged substantially parallel to said longitudinal axis so as to form a plurality of interstitial passageways therebetween, each of said interstitial passageways having cross-sectional dimensions perpendicular said longitudinal axis of less than the shortest wavelength of light guided by said fiber.

14. The fiber of claim 13 wherein each tube structure of said first set defines a channel having cross-sectional dimensions perpendicular said longitudinal axis of less than a shortest wavelength of light guided by said fiber.

15. The fiber of claim 9 wherein said fiber cladding layer includes a plurality of rod structures arranged about said fiber core.

16. The fiber of claim 15 wherein said rod structures are arranged substantially parallel to said longitudinal axis so as to define a plurality of interstitial passageways therebetween.

17. The fiber of claim 16 wherein said rod structures are arranged such that said interstitial passageways have cross-sectional dimensions perpendicular said first axis of less than a shortest wavelength of light guided by said fiber.

18. The fiber of claim 17 wherein each of said rod structures are substantially cylindrical.

19. The fiber of claim 18 wherein said rod structures are fabricated from a material having an index of refraction less than said first index of refraction.

20. A low index of refraction optical fiber comprising:
a fiber core of a first index of refraction circumscribing a longitudinal axis, said fiber core including a first set of rod structures and a fiber cladding layer circumscribing said core, said cladding layer having a second index of refraction less than said first index of refraction wherein each of said rod structures are arranged substantially parallel to said longitudinal axis so as to form a plurality of interstitial passageways therebetween, each of said interstitial passageways having cross-sectional dimensions perpendicular said longitudinal axis of less than the shortest wavelength of light guided by said fiber.

21. The fiber of claim 20 wherein said rod structures are fabricated from a first material and said cladding is fabricated from a second material having said second index of refraction.

22. The fiber of claim 20 wherein said cladding layer includes a set of tube structures arranged about said core, each of said tube structures defining a channel having cross-sectional dimensions perpendicular said longitudinal axis of less than the shortest wavelength of light guided by said fiber.

23. The fiber of claim 22 wherein each of said channels are cylindrical and said set of tube structures are arranged substantially parallel to said longitudinal axis so as to form a plurality of interstitial passageways therebetween, each of said interstitial passageways having cross-sectional dimensions perpendicular said longitudinal axis of less than the shortest wavelength of light guided by said fiber.

24. The fiber of claim 13 wherein each tube structure of said first set defines a channel having cross-sectional dimensions perpendicular said longitudinal axis of less than a shortest wavelength of light guided by said fiber.

25. The fiber of claim 20 wherein said fiber cladding layer includes a second set of rod structures arranged about said fiber core.

26. The fiber of claim 25 wherein said second set of rod structures are arranged substantially parallel to said longitudinal axis so as to define a plurality of interstitial passageways therebetween.

27. The fiber of claim 26 wherein said second set of rod structures are arranged such that said interstitial passageways have cross-sectional dimensions perpendicular said first axis of less than a shortest wavelength of light guided by said fiber.

28. The fiber of claim 18 wherein said rod structures are fabricated from a material having an index of refraction less than said first index of refraction.

29. A low index of refraction optical fiber comprising:
a fiber core of a first index of refraction circumscribing a longitudinal axis; and
a fiber cladding layer having a second index of refraction less than said first index of refraction, said layer including a plurality of densely packed tube structures circumscribing said fiber core.

30. A low index of refraction optical fiber comprising:
a fiber core of a first index of refraction circumscribing a longitudinal axis, said fiber core including a first set of densely packed tube structures; and
a fiber cladding layer circumscribing said core, said cladding layer having a second index of refraction less than said first index of refraction.

31. A low index of refraction optical fiber consisting of:
a fiber core of a first index of refraction circumscribing a longitudinal axis, said fiber core including a first set of densely packed rod structures and
a fiber cladding layer circumscribing said core, said cladding layer having a second index of refraction less than said first index of refraction.

* * * * *